Nov. 8, 1927. 1,648,023
R. J. McCARTY, JR
MEANS FOR CONTROLLING THE OPERATION OF BOOSTER MOTORS OR
AUXILIARY PROPULSION UNITS
Filed Feb. 21, 1924
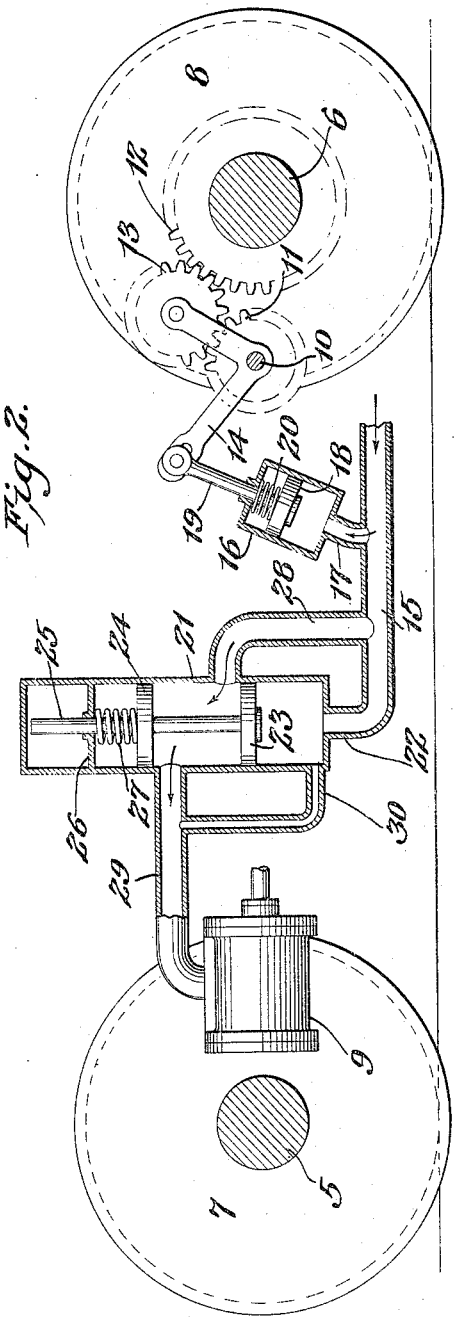
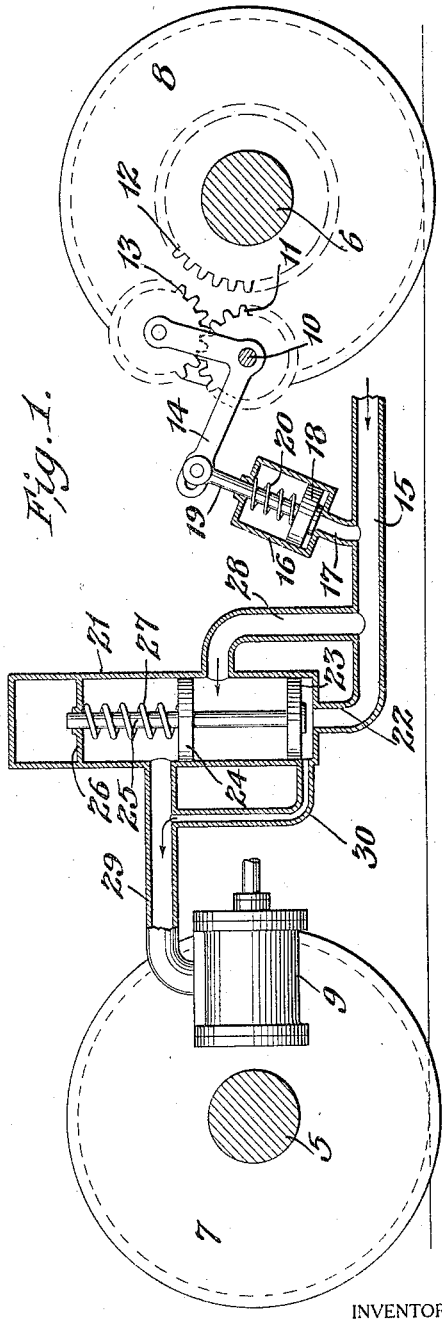
INVENTOR
R. J. McCarty, Jr.
BY C. P. Goepel
ATTORNEY Patented Nov. 8, 1927.

1,648,023

UNITED STATES PATENT OFFICE.

RICHARD J. McCARTY, JR., OF ALBANY, NEW YORK, ASSIGNOR, BY MESNE ASSIGNMENTS, TO BETHLEHEM STEEL COMPANY, A CORPORATION OF PENNSYLVANIA.

MEANS FOR CONTROLLING THE OPERATION OF BOOSTER MOTORS OR AUXILIARY PROPULSION UNITS.

Application filed February 21, 1924. Serial No. 694,186.

This invention relates to an improved means for controlling the operation of booster motors or auxiliary propulsion units and is primarily designed for the purpose of automatically governing the supply of the steam or other energizing medium to the booster motor cylinders and effecting a proper entrainment of the driving shaft of the motor with the axle to be driven thereby.

In an application filled by John A. McGrew and James T. Loree on December 15th, 1921, Serial No. 522,525, there is described and claimed such an automatic control means for vehicle propulsion units or locomotive boosters wherein a pressure actuated piston valve is directly interposed in the steam supply line leading to the booster cylinders, said valve piston being operatively connected to a movable entraining gear whereby, under the initial pressure influence of the steam, said valve piston is moved to effect an initial slow speed operation of the booster motor so that the entraining gear is positively rotated by the driving shaft at approximately the speed of rotation of the gear on the truck axle as the entraining gear is moved into enmeshed relation with the gear on said axle. When full entrainment of the gears takes place, said valve piston is in such a position as to permit of the free passage of steam in maximum volume to the booster cylinders so that the booster is operated at maximum power. This specific single automatic valve control for the booster motor is also fully described and specifically claimed in Patent No. 1,447,352, granted to the said John A. McGrew and James T. Loree on March 6th, 1923.

It is the primary object and purpose of the present invention to provide another automatic control means for such booster motors whereby the same initial idling operation of the booster during the entraining action may be secured, the said means being also actuated solely by the pressure influence of the steam supplied to the booster motor cylinders. In the present instance, however, I provide separate means for operating the entraining gear and for controlling the supply of motive fluid to the booster cylinders in lieu of the single automatic control valve as shown in said patent above referred to. Further, in the present instance, the cylinder with the piston operating therein connected to the entraining gear is not located directly in the steam supply line but is spaced therefrom and has a branch pipe connection wth the steam supply pipe. Therefore, it will be appreciated that it is not necessary to locate the booster steam supply pipe contiguous to the entraining gear, but said pipe might be arranged in any other convenient location so that there will be ample clearance space above the ties or the other parts of the road bed.

It is another object of the present invention to provide a very simple means whereby the quantity of steam initially admitted to the booster motors may be varied and the idling speed of the booster regulated accordingly.

With the above and other objects in view, the invention consists in the improved control means for booster motors and in the form, construction and relative arrangement of the several parts thereof as will be hereinafter more fully described, illustrated in the accompanying drawings, and subsequently incorporated in the subjoined claims.

In the drawing wherein I have illustrated more or less diagrammatically, one practical embodiment of the present improvements and in which similar reference characters designate corresponding parts throughout the several views:

Figure 1 is a longitudinal sectional view illustrating the several elements of the automatic control means in their normal relative positions and with the booster disentrained from the axle it is to drive; and Figure 2 is a similar view showing the parts of the control means after they have operated to first entrain the booster driving shaft with the truck axle and then supply steam in maximum volume to the booster motor cylinders.

The automatic motor control mechanism which I shall presently describe in detail, was primarily designed for the purpose of automatically effecting an operative connection or entrainment of a booster motor driving shaft with one of the truck axles constituting a load bearing or sustaining axle for the tender of a locomotive. However, in so far as my present improvements are concerned, the booster motor may be used for positively driving one of the axles of the pilot or trailer truck of the locomotive or the truck axle of any one of the train carriages, the purpose being to provide means for increasing tractive power and aiding the main engine of the locomotive in the propulsion of the train at low speeds, as in starting from a terminal or upon controlling grades.

In the accompanying drawing I have illustrated only so much of the booster motor and the truck with which it is associated, as will enable the nature of my improvements to be clearly understood. Accordingly, I have shown merely the spaced truck axles 5 and 6 upon the opposite ends of which the weight supporting wheels 7 and 8 respectively, engaged upon the track rails, are secured in any approved manner. The booster motor includes cylinders of suitable dimensions, one of which is indicated at 9, the pistons operating within said cylinders having suitable driving connections (not shown) with a drive shaft 10. Preferably, I mount or arrange this booster or propulsion unit between and upon the spaced axles 5 and 6 in the manner shown in the patent granted to John A. McGrew and James T. Loree of April 11th, 1922, No. 1,412,250.

The drive shaft 10 is arranged contiguous to and in parallel relation with the truck axle 6 but normally has no driving connection therewith. For the purpose of entraining said driving shaft with the axle 6 to impart a positive driving impulse to the latter, any suitable type of disengageable gearing might be employed. However, I have herein shown a conventional type of such gearing consisting of a gear element 11 fixed upon the driving shaft 10 and a gear element 12 fixed upon the axle 6. An idler gear 13 is in constant mesh with driving gear 11 and is mounted for planetary movement as well as axial rotation in one fork of an angular rocker member 14 which is mounted for oscillating movement upon the drive shaft 10.

Steam is supplied to the booster motor cylinders through the pipe 15 which is preferably connected to the superheated steam supply pipes exteriorly of the locomotive boiler which supplies the main engine cylinders with superheated steam. A cylinder 16 is suitably mounted and arranged in spaced relation to the steam supply pipe 15 and at one of its ends is connected to said supply pipe by means of the branch pipe 17. A piston 18 reciprocates in this cylinder and has a rod 19 operatively connected to the other arm of the rocker member 14. The piston 18 is urged in one direction in said cylinder to its normal position by means of a suitable spring 20. Between the cylinder 16 and the booster motor cylinders, a second cylinder 21 is arranged and connected at one of its ends by the branch pipe 22 with the steam supply pipe 15. A balanced piston is arranged in this latter cylinder, said piston comprising spaced heads 23 and 24, respectively, connected by the rod or stem 25 suitably guided in the web 26. Between this web and the piston head 24 a spring 27 is arranged and normally acts to urge the piston in one direction in the cylinder to its normal position. At one side, the cylinder 21 is connected by the pipe 28 to the steam supply pipe 15 at a point between the branch connections 17 and 22 respectively, between said pipe and the cylinders 16 and 21. At its opposite side and at a point spaced longitudinally thereof from the pipe 28, the cylinder 21 is connected by the pipe 29 to the booster motor cylinders 9. This latter pipe is also connected by the by-pass pipe 30 of restricted diameter with the lower end of cylinder 21. If desired, a bushing of suitable size or a suitable valve, or both, may be arranged in this by-pass pipe to further restrict the flow of steam therethrough and thus regulate the volume of steam passing through said pipe to the motor cylinders.

From the foregoing description, the operation of the device will be readily understood. Thus, when the main throttle valve of the locomotive is opened to supply the main engine cylinders with steam, steam also passes through the pipe 15 and first flows through the by-pass connection 30 via pipe 22 and lower end of cylinder 21 to the booster cylinders in small volume, thus causing the booster motor to idle or operate at low speed, such idling operation of the booster positively rotating the drive shaft 10 and thus also rotating the idler gear 13 on its axis. As steam pressure builds up in the pipe 15, it enters the cylinder 16, moving the piston 18 therein against the action of spring 20 and rocking the member 14 to also impart a planetary movement to the idler gear 13 so that said gear, while rotating at approximately the speed of rotation of the fixed gear 12 on axle 6, is caused to come into full meshing relation with the teeth of the latter gear. The further building up of steam pressure in the pipe 15 and the connections 22 and 28 with the cylinder 21 moves the piston in said cylinder from its normal position, as shown in Figure 1, where communication between the pipes 28 and 29 is cut off, to the position shown in Figure 2, so that open communication through said pipes and the cylinder 21 is established and steam then passes in full volume from pipe 15 through said cylinder between the piston heads 23 and 24 and through the pipe 29 to the booster motor cylinders so that the booster motor is then supplied with steam in maximum quantity and said motor thereafter operated at full power. These operations in proper sequence are controlled by the springs 20 and 27, the relative resistance of which to the steam pressure entering the cylinders from pipe 15 is determined in accordance with the relative size and proportions of the cylinders 16 and 21. In the arrangement shown, the spring 27 is considerably stronger than the spring 20 so that the entrainment action will be complete before the maximum steam pressure has built up in the supply pipe 15.

In the drawings, I have illustrated one arrangement whereby the entraining action may be properly controlled and synchronized with the operation of the booster, in which the automatic control valve is not located directly in the steam supply pipe leading to the booster cylinders. However, it is possible that other alternatives for the arrangement described might be devised whereby similar results could be obtained. Accordingly, it is to be understood that I do not desire to be limited to the precise construction and relative arrangement of the several parts as herein disclosed, but reserve the privilege of adopting all such legitimate changes as may be fairly embodied within the spirit and scope of the invention as claimed.

I claim:

1. In combination with a booster motor and driving shaft operated thereby, entrainment mechanism for connecting said driving shaft with a truck axle, including gear elements fixed upon said shaft and axle, and an idler gear in constant mesh with the gear on the driving shaft, a steam supply pipe for the cylinders of the booster motor, connections between said pipe and the booster motor cylinders including a steam pressure actuated valve whereby the booster motor is initially operated at low speed and thereafter at maximum power, and additional means operatively connected to said idler gear and also responsive to the influence of pressure in said steam supply pipe to move said idler gear into entrained relation with the gear on said axle during the initial low speed operation of the booster.

2. In combination with a booster motor and a driving shaft operated thereby, entrainment gearing for connecting said shaft to a truck axle including gears fixed to said shaft and axle and an idler gear in constant mesh with the gear on said shaft, a steam supply pipe for the booster motor, a cylinder, a branch pipe connecting said cylinder with said supply pipe, a piston operating in said cylinder, connections between said piston and said idler gear whereby the latter is moved to entrained position by steam pressure entering said cylinder from the supply pipe, a by-pass pipe connection between said supply pipe and the booster motor cylinders to initially supply steam to said cylinders in reduced volume and effect the low speed operation of the booster during the entraining action, and additional means responsive to the pressure influence of the steam to subsequently supply steam in maximum volume to the booster cylinders whereby the booster is operated at maximum power.

3. In combination with a booster motor and a driving shaft operated thereby, entrainment gearing for connecting said shaft to a truck axle including gears fixed to said shaft and axle and an idler gear in constant mesh with the gear of said shaft, a steam supply pipe for the booster motor, a cylinder, a branch pipe connecting said cylinder with said supply pipe, a piston operating in said cylinder, connections between said piston and said idler gear whereby the latter is moved to entrained position by steam pressure entering said cylinder from the supply pipe, a by-pass pipe connection between said supply pipe and the booster motor cylinders to initially supply steam to said cylinders in reduced volume and effect the low speed operation of the booster during the entraining action, a second cylinder connected to said steam supply pipe and to the booster motor cylinders, and a steam pressure actuated valve in said cylinder controlling the supply of steam to the booster motor cylinders and operable subsequent to the entraining action by the building up of pressure in the supply pipe whereby the booster motor is supplied with steam in maximum quantity to thereafter operate said booster motor at full power.

4. In combination with a booster motor, means for entraining said booster motor with an axle including a power transmitting element movable to and from an entrained position, a steam supply pipe for the booster motor cylinders, means controlling the passage of steam from said pipe to the cylinders to effect an initial idle operation of the motor at low speed and the subsequent operation thereof at maximum power, and independent means connected to said power transmitting element and actuated by the cumulative pressure influence of steam in the supply pipe during the initial idle operation of the motor to move said element into entrained driving relation with said axle.

In testimony that I claim the foregoing as my invention, I have signed my name hereto.

RICHARD J. McCARTY, Jr.